United States Patent
Ogawara et al.

(10) Patent No.: US 6,437,471 B1
(45) Date of Patent: Aug. 20, 2002

(54) SINGLE-BEARING PERMANENT-MAGNET MOTOR

(75) Inventors: Toshiki Ogawara; Tomoaki Ikeda, both of Tokyo (JP)

(73) Assignee: Sanyo Denki Co., Ltd., Tokyo (JP)

( * ) Notice: Subject to any disclaimer, the term of this patent is extended or adjusted under 35 U.S.C. 154(b) by 0 days.

(21) Appl. No.: 09/571,704

(22) Filed: May 15, 2000

(30) Foreign Application Priority Data

May 31, 1999 (JP) ............................ 11-151569

(51) Int. Cl.[7] ............................ H02K 5/16; H02K 5/173
(52) U.S. Cl. ................ 310/90; 417/423.12; 310/156.04
(58) Field of Search ........................ 310/67 R, 90, 310/156.04; 417/423.1, 423.12, 423.14

(56) References Cited

U.S. PATENT DOCUMENTS

| | | | |
|---|---|---|---|
| 5,343,104 A | * 8/1994 | Takahashi et al. | 310/90 |
| 5,410,201 A | * 4/1995 | Tanaka et al. | 310/68 B |
| 5,442,247 A | * 8/1995 | Suzuki et al. | 310/67 R |
| 5,559,674 A | 9/1996 | Katsui | 361/697 |
| 5,789,834 A | * 8/1998 | Katoh et al. | 310/67 R |
| 5,947,704 A | * 9/1999 | Hsieh | 417/423.12 |
| 5,982,064 A | * 11/1999 | Umeda et al. | 310/90 |
| 6,050,785 A | * 4/2000 | Horng | 417/354 |
| 6,091,172 A | * 7/2000 | Kakinuma et al. | 310/71 |

FOREIGN PATENT DOCUMENTS

| | | | |
|---|---|---|---|
| JP | 2-254952 | * 10/1990 | H02K/7/14 |
| JP | 5-168212 | * 7/1993 | H02K/5/173 |
| JP | 6-335191 | * 12/1994 | H02K/5/173 |
| JP | 8-182253 | * 7/1996 | H02K/7/14 |
| JP | 11-150908 | * 6/1999 | 310/90 |
| JP | 2000-350402 | * 12/2000 | H02K/5/173 |

* cited by examiner

Primary Examiner—Karl Tamai
(74) Attorney, Agent, or Firm—Rankin, Hill, Porter & Clark LLP

(57) ABSTRACT

Vibration applied to a rotary shaft in an axial direction is suppressed when the rotary shaft is supported by a single bearing. A width dimension in a direction parallel with an axial direction of rotor-side magnetic poles of a permanent magnet unit is set to be larger than a width dimension in the direction parallel with the axial direction of stator-side magnetic poles. The rotor-side magnetic poles are fixed to a peripheral wall portion of a cup member such that the rotor-side magnetic poles completely face the stator-side magnetic poles and project toward a front side further than an end face of the stator-side magnetic poles on a motor support side. By using thrust formed of magnetic attracting force generated by decentering a magnetic center of the rotor-side magnetic poles and a magnetic center of the stator-side magnetic poles, the vibration of the rotary shaft in the axial direction is suppressed.

4 Claims, 2 Drawing Sheets

SINGLE-BEARING PERMANENT-MAGNET MOTOR

BACKGROUND OF THE INVENTION

1. Field of the Invention

The present invention relates to a single-bearing permanent-magnet motor and a single-bearing fan motor.

2. Description of the Related Art

FIG. 4 is a sectional view of a half portion showing a prior-art electronic component refrigerator in which a fan motor 102 using a permanent-magnet motor 101 as a driving source is combined with a heat sink 103 for refrigerating electronic components such as a CPU and which is cut in half at a rotary shaft 103 of the motor 101 as a center. Because there are many patents such as U.S. Pat. No. 5,559,674 which disclose this type of electronic component refrigerator, detailed description will be omitted. In this prior-art fan motor 102, the rotary shaft 103 is supported by two bearings 104 and 105 which are spaced and disposed in an axial direction. This is because large vibration is generated in the axial direction or a vibration phenomenon in which an axis of the rotary shaft swings about a shaft center line at rest occurs when the rotary shaft rotates if only one bearing is provided.

As electronic equipment within which the electronic components are mounted is slimmed down, a desire to slim down the electronic component refrigerator for which this type of fan motor is used is growing. Demands for weight reduction and cost reduction are also intense. In order to satisfy these demands, provision of a single bearing was contemplated, but was not realized in actuality because of the above-described problem.

SUMMARY OF THE INVENTION

It is an object of the present invention to provide a single-bearing permanent-magnet motor and a single-bearing fan motor which can suppress generation of vibration or a vibration phenomenon in a rotary shaft even if the rotary shaft is supported by a single bearing.

It is another object of the present invention to provide a single-bearing permanent-magnet motor and a single-bearing fan motor which can suppress vibration in an axial direction of the rotary shaft by a simple structure.

A single-bearing permanent-magnet motor according to the present invention comprises, in a case of an inner rotor-type motor, a rotary shaft, a single bearing for rotatably supporting the rotary shaft, a coming off preventing member mounted to one end of the rotary shaft for preventing the rotary shaft from coming off the bearing, a cup member having a base wall portion fixed to the other end of the rotary shaft and a cylindrical peripheral wall portion standing toward one side in an axial direction of the rotary shaft from an outer peripheral portion of the base wall portion, a permanent magnet unit fixed to an inner peripheral face of the peripheral wall portion such that a plurality of rotor-side magnetic poles formed of permanent magnets are arranged in a peripheral direction of the peripheral wall portion, a motor support having a cylindrical bearing holder that holds the bearing therein, a stator core fixed to the motor support and having a plurality of stator-side magnetic poles each including a pole face disposed to face the respective rotor magnetic poles of the permanent magnet unit, and a plurality of exciting windings mounted to the stator core. In a case of an outer rotor-type motor, the permanent magnet unit is not mounted to the above cup member but positioned on an outside of the bearing holder and fixed to the rotary shaft. The stator core has a plurality of stator-side magnetic poles facing the permanent magnet unit at an inner peripheral portion and is fixed to the motor support.

In the invention, a center (magnetic center in a width direction of the permanent magnet unit) of a width in a direction parallel with the axial direction of the permanent magnet unit is deviating toward the one end side of the rotary shaft from a center (magnetic center in a width direction of the stator-side magnetic poles) of a width in the direction parallel with the axial direction of the pole face of the stator-side magnetic poles. Thus, thrust formed of magnetic attracting force for aligning the magnetic center of the permanent magnet unit in the width direction with the magnetic center of the stator-side magnetic poles in a width direction (thrust toward the other side in the axial direction of the rotary shaft, i.e., thrust from the one end side of the rotary shaft toward the other end side) acts on the rotary shaft. As a result, the coming off preventing member is kept being pushed against the bearing, vibration and swinging of the rotary shaft in the axial direction are suppressed, and the rotary shaft can be supported by the single bearing without a hindrance.

In order to prevent reduction of running torque of the motor, a width dimension in the direction parallel with the axial direction of the rotor-side magnetic poles of the permanent magnet unit is set to be larger than a width dimension in the direction parallel with the axial direction of the stator-side magnetic poles. The permanent magnet unit is fixed to an inner peripheral face of the peripheral wall portion of the cup member such that an end portion of the rotary shaft positioned on the one side in the axial direction projects further than an end portion of a stator core unit positioned on the one side in the axial direction. Thus, it is possible to generate the above thrust and to maintain the running torque similar to that in prior art.

As the bearing to be used, a ball-and-roller bearing or a rolling bearing having a structure in which a plurality of rolling elements such as balls or rollers are disposed between an inner ring and an outer ring is preferable. A projecting dimension of the portion of the rotor-side magnetic poles projecting toward the one side in the axial direction of the rotary shaft is set such that thrust for pushing the coming off preventing member against the inner ring of the rolling bearing has such a value as to sufficiently suppress vibration of the rotary shaft in the axial direction. In the case of the rolling bearing, large friction is not generated between the coming off preventing member and the bearing.

In the case of employing the above structure, if an annular spacer ring is fitted with the rotary shaft such that the spacer ring is positioned between the inner ring of the rolling bearing and the base wall portion of the cup member, the vibration of the rotary shaft in the axial direction can be suppressed even when the thrust is small.

When the respective exciting windings are mounted to the stator core through an insulator made of insulating material, a projecting portion extending further than an end portion of the bearing holder on the cup member side (end portion on the other side in the axial direction of the rotary shaft) may be provided to the insulator. Thus, the projecting portion functions as spacer means to suppress the vibration of the rotary shaft in the axial direction even when the thrust is small if the above spacer ring is not disposed.

If the invention is concretely specified as a single-bearing fan motor, the single-bearing fan motor comprises a rotary shaft, a single rolling bearing for rotatably supporting the rotary shaft, a coming off preventing member mounted to one end of the rotary shaft for preventing the rotary shaft from coming off the rolling bearing, a cup member having a base wall portion fixed to the other end of the rotary shaft and a cylindrical peripheral wall portion standing toward one side in an axial direction of the rotary shaft from an outer peripheral portion of the base wall portion, a permanent magnet unit fixed to an inner peripheral face of the peripheral wall portion such that a plurality of rotor-side magnetic poles formed of permanent magnets are arranged in a peripheral direction of the peripheral wall portion, a plurality of blades fixed to an outer periphery of the peripheral wall portion of the cup member for exhaling toward the other side, a motor support having a cylindrical bearing holder that holds the rolling bearing therein, and a stator core fixed to the motor support and having a plurality of stator-side magnetic poles facing the plurality of rotor-side magnetic poles of the permanent magnet unit. A width dimension in a direction parallel with the axial direction of the rotor-side magnetic poles of the permanent magnet unit is determined such that the rotor-side magnetic poles completely face the stator-side magnetic poles and project toward the one side in the axial direction further than an end portion of the stator-side magnetic poles on the one side in the axial direction and that thrust for pushing the coming off preventing member against an inner ring of the rolling bearing is such a value as to sufficiently suppress vibration of the rotary shaft.

In such a fan motor, it is necessary to generate thrust force that can resist force acting on the rotary shaft by exhalation if a direction of exhalation of the plurality of blades is the same as a direction in which the thrust force acts.

DESCRIPTION OF THE PREFERRED EMBODIMENTS

Figure 1:
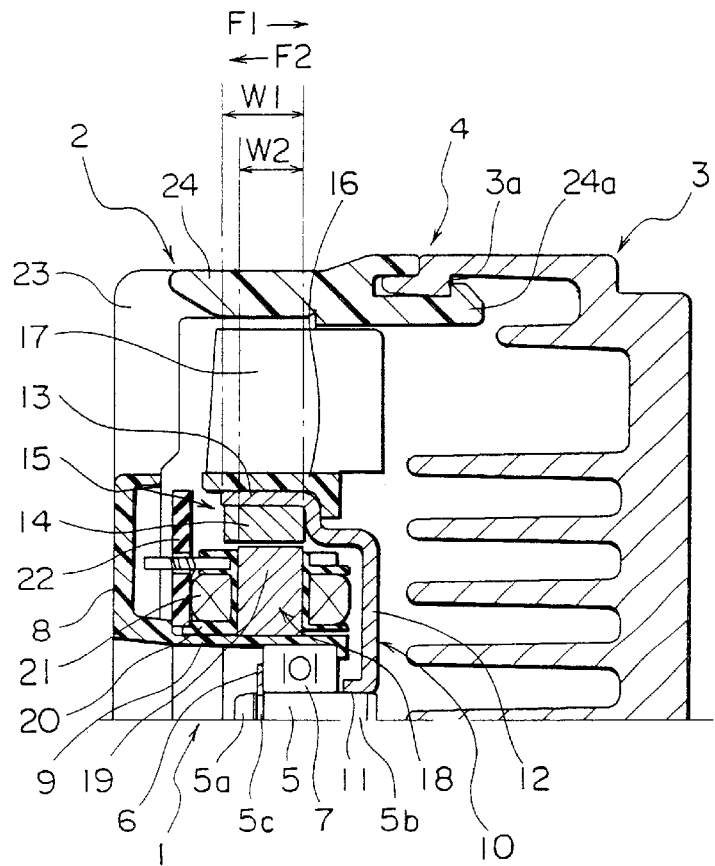
FIG. 1 is a sectional view showing a state in which an electronic component refrigerator having a fan motor using a single-bearing permanent-magnet motor of an embodiment of the present invention as a driving source and mounted to a heat sink for refrigerating electronic components such as a CPU is cut in half at a rotary shaft of the motor as a center.

An example of an embodiment according to the present invention will be described below in detail by reference to the drawings. FIG. 1 is a sectional view showing a state in which an electronic component refrigerator 4 having a fan motor 2 according to the example of the embodiment of the invention using a single-bearing permanent-magnet motor 1 as a driving source and mounted to a heat sink 3 for refrigerating electronic components such as a CPU is cut in half at a rotary shaft 5 of the motor 1 as a center. As shown in FIG. 1, an annular coming off preventing member 6 is fitted with an annular groove 5c formed at one end 5a of the rotary shaft 5 of the motor 1. The rotary shaft 5 is supported by a single rolling bearing 7. An inner ring of the rolling bearing 7 is fitted with the rotary shaft 5 and the coming off preventing member 6 is in contact with the inner ring. The outer ring of the rolling bearing 7 is fitted with and retained by an inside of a cylindrical bearing holder 9 formed integrally at a center portion of a motor support 8 made of insulating resin.

To the other end 5b of the rotary shaft 5, a cup member 10 made of material having magnetic permeability is fixed. The cup member 10 has a base wall portion 12 including a fitting hole 11 with and to which the other end 5b of the rotary shaft 5 is fitted and fixed and a cylindrical peripheral wall portion 13 standing toward one side (a left side in FIG. 1 or a side on which a motor support 8 is positioned and which will be referred to as a front side while an opposite side will be referred to as a rear side hereafter) in an axial direction of the rotary shaft 5 from an outer peripheral portion of the base wall portion 12. Disposed on an inner peripheral side of the peripheral wall portion 13 is a permanent magnet unit 15 having a plurality of rotor-side magnetic poles 14 made of permanent magnets and fixed to an inner peripheral face of the peripheral wall portion 13 such that the magnetic poles 14 are arranged in a peripheral direction of the peripheral wall portion 13. The plurality of rotor-side magnetic poles 14 may be formed of a plurality of permanent magnets or may have a single annular permanent magnet having north poles and south poles alternately in the peripheral direction. An annular member 16 is fitted with an outer peripheral face of the peripheral wall portion 13 and a plurality of blades 17 are fixed to the outer peripheral face of the annular member 16 at predetermined intervals in the peripheral direction. Shapes of the plurality of blades 17 are determined such that the blades 17 blow or exhale air toward the heat sink 3 when the rotary shaft 5 rotates.

A stator core 18 is fitted with an outer peripheral portion of the bearing holder 9, thereby fixing the stator core 18 to the motor support 8. The stator core 18 has stator-side magnetic poles 19 formed of a plurality of salient-pole magnetic poles disposed at predetermined intervals in the peripheral direction. Pole faces of the plurality of rotor-side magnetic poles 14 and pole faces of the plurality of stator-side magnetic poles 19 face each other through a gap in a diameter direction of the rotary shaft 5.

An insulator 20 made of insulating resin is mounted to the stator core 18 and exciting windings 21 for a plurality of phases are wound around the plurality of stator-side magnetic poles 19 of the stator core 18. A reference numeral 22 designates a circuit board on which a control circuit for controlling exciting current of the exciting windings 21 is mounted. A cylindrical housing 24 is disposed on an outside of the motor support 8 through a plurality of webs 23 disposed at predetermined intervals in the peripheral direction. A hook chip 24a and a stepped portion 3a for snapping in or engagement are respectively formed on the housing 24 and the heat sink 3.

In this example, a width dimension W1 in a direction parallel with an axial direction of the rotor-side magnetic poles 14 of the permanent magnet unit 15 is larger than a width dimension W2 in a direction parallel with an axial direction of the stator-side magnetic poles 19. The rotor-side magnetic poles 14 are fixed to the peripheral wall portion 13 such that the rotor-side magnetic poles 14 completely face the stator-side magnetic poles 19 and project toward the one side in the axial direction, i.e., the front side further than an end portion of the stator-side magnetic poles 19 on the one side in the axial direction, i.e., the front side or an end face of the stator-side magnetic poles 19 on the motor support side. In this manner, a center of a width of the permanent magnet unit 15 in a direction parallel with the axial direction is deviating from a center of a width of the pole face of the stator-side magnetic poles 19 in a direction parallel with the axial direction toward the one end 5a side of the rotary shaft 5, i.e., the front side (decentered). In such a state, thrust F1 for aligning a magnetic center of the permanent magnet unit 15 in a width direction with a magnetic center of the stator-side magnetic pole 19 in a width direction (thrust toward the other side in the axial direction of the rotary shaft 5 or the heat sink 3, i.e., the rear side or thrust from the one end 5a side of the rotary shaft 5 toward the other end 5b side) acts on the rotary shaft 5. As a result, the coming off preventing member 6 is pushed against the inner ring of the bearing 7, vibration and swinging of the rotary shaft 5 in the axial direction are suppressed, and the rotary shaft 5 can be supported by the single bearing 7 without a hindrance.

When the fan motor 2 rotates, the blades 17 discharge or blow air toward the heat sink 3, i.e., from the front side toward the rear side (from a left side toward a right side in FIG. 1), and as a result, thrust F2 from the rear side toward the front side (from the right side toward the left side in FIG. 1) acts on the rotary shaft 5. The thrust F2 resists the thrust F1 (thrust from the left side toward the right side in FIG. 1) formed of magnetic attracting force and generated because the magnetic center of the permanent magnet unit 15 is deviating toward the front side from the magnetic center of the stator core 18. The thrust F1 is transmitted to the rotary shaft 5 through the cup member 10. In order to prevent generation of vibration in the axial direction by the respective forces F1 and F2 in opposite directions transmitted in the axial direction of the rotary shaft 5, it is necessary to design the single-bearing fan motor such that F1 is constantly greater than F2. Therefore, the above-described width dimension W1 is determined in view of this point.

Figure 2:
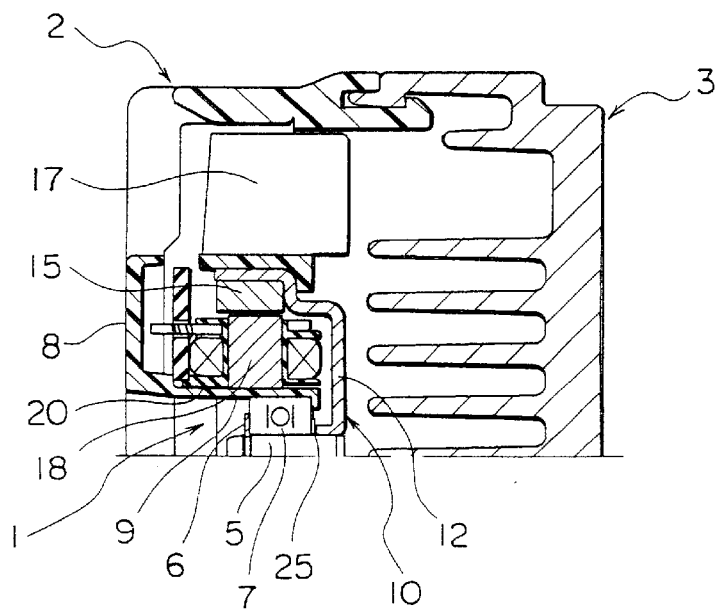
FIG. 2 is a sectional view showing a half portion of another embodiment of the present invention.

FIG. 2 is a sectional view showing a structure of another embodiment of the electronic component refrigerator. FIG. 2 is shown in the similar form to FIG. 1. The embodiment in FIG. 2 is different from the embodiment in FIG. 1 in that an annular spacer ring 25 is fitted with and added to between the inner ring of the rolling bearing 7 and the base wall portion 12 of the cup member 10. If such a spacer ring 25 is added, it is possible to mechanically reduce displacement in the axial direction of the rotary shaft 5 and to protect the bearing 7 from shock or vibration.

Figure 3:
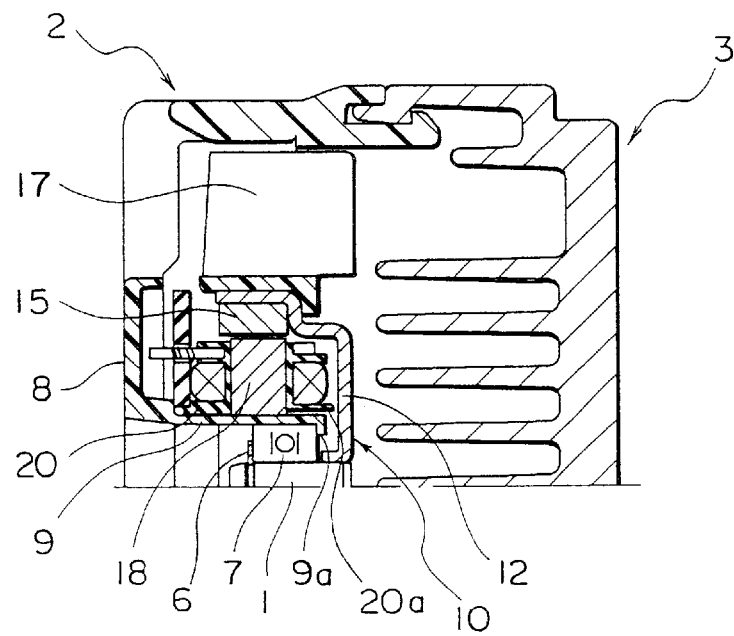
FIG. 3 is a sectional view showing a half portion of yet another embodiment of the invention.
Figure 4:
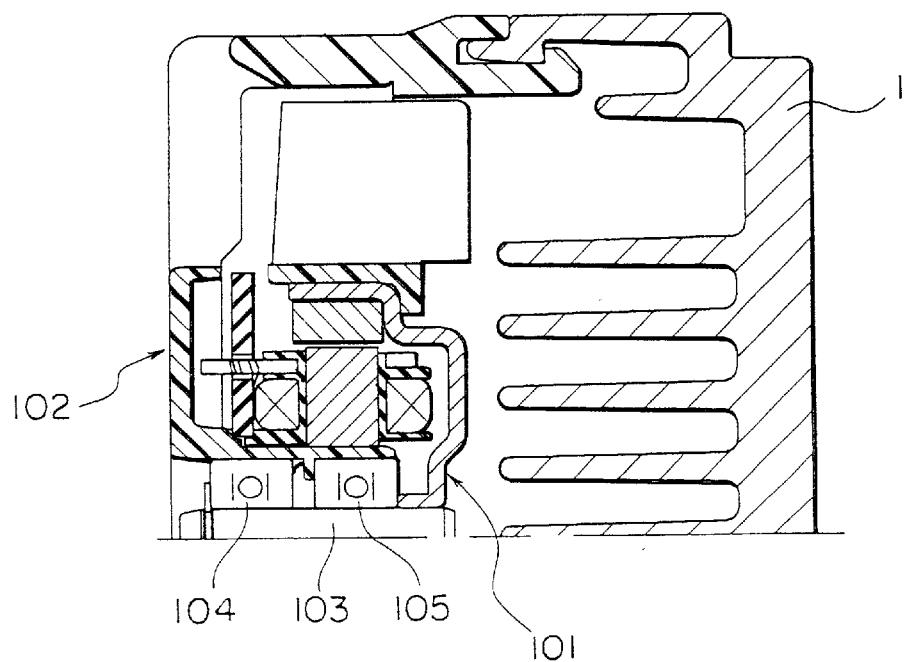
FIG. 4 is a sectional view of a half portion of a prior-art electronic component refrigerator having a fan motor.

FIG. 3 is a sectional view showing a half portion of yet another electronic component refrigerator and shown in the similar form to FIGS. 1 and 2. An embodiment in FIG. 3 is different from the embodiment in FIG. 1 in that a projecting portion 20a extending further than an end portion 9a of the bearing holder 9 on the rear side i.e., the other side in the axial direction (the right side when facing FIG. 1) is provided to the insulator 20. In other points, the embodiment in FIG. 3 is similar to the embodiment in FIG. 1. A purpose of providing the projecting portion 20a is similar to that of the spacer ring 25 in FIG. 2.

Although the above embodiments are examples in which the single-bearing fan motor 2 is mounted to the heat sink 3, it is of course possible to apply the invention to the inner rotor-type or outer rotor-type single-bearing permanent-magnet motor itself.

According to the invention, vibration in the axial direction of the rotary shaft of the motor is suppressed by using the thrust formed of magnetic attracting force generated by decentering the magnetic center of the rotor-side magnetic poles and the magnetic center of the stator-side magnetic poles. Therefore, it is possible to solve the problems which occur in the case of supporting the rotary shaft by using the single bearing by the simple structure.

While a preferred embodiment of the invention has been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A single-bearing permanent-magnet motor comprising:

a rotary shaft;

a single bearing for rotatably supporting said rotary shaft, said single bearing being formed of a roller bearing;

a coming off preventing member mounted to one end of said rotary shaft for preventing said rotary shaft from coming off said bearing;

a cup member having a base wall portion fixed to the other end of said rotary shaft and a cylindrical peripheral wall portion standing toward one side in an axial direction of said rotary shaft from an outer peripheral portion of said base wall portion;

a permanent magnet unit fixed to an inner peripheral face of said peripheral wall portion such that a plurality of rotor-side magnetic poles formed of permanent magnet are arranged in a peripheral direction of said peripheral wall portion;

a motor support having a cylindrical bearing holder that holds said bearing therein;

a stator core fixed to said motor support and having a plurality of stator-side magnetic poles each including a pole face facing said plurality of rotor-side magnetic poles of said permanent magnet unit;

a plurality of exciting windings mounted to said stator core;

wherein a center of a width in a direction parallel with said axial direction of said permanent magnet unit is deviating toward said one end side of said rotary shaft from a center of a width in said direction parallel with said axial direction of the pole face of said stator-side magnetic poles, and wherein a width dimension in said direction parallel with said axial direction of said rotor-side magnetic poles of said permanent magnet unit is larger than a width dimension in said direction parallel with said axial direction of said stator-side magnetic poles;

said rotor-side magnetic poles are fixed to said peripheral wall portion such that said rotor-side magnetic poles completely face said stator-side magnetic poles and project toward said one side in said axial direction further than an end portion of said stator-side magnetic poles on said one side in said axial direction, a projecting dimension of said portion of said rotor side magnetic poles projecting toward said one side in said axial direction is determined such that thrust for pushing said coming off preventing member against an inner ring of said rolling bearing is such a value as to sufficiently suppress vibration of said rotary shaft in said axial direction; and, wherein said rotary shaft is fitted with an annular spacer ring such that said spacer ring is positioned between said inner ring of said rolling bearing and said base wall portion of said cup member.

2. A single-bearing permanent-magnet motor according to claim 1, wherein said exciting windings are mounted to said stator core through an insulator made of insulating material; and said insulator is provided with a projecting portion projecting toward said other side further than an end portion of said bearing holder on said other side in said axial direction.

3. A single-bearing fan motor comprising:

a rotary shaft;

a single rolling bearing for rotatably supporting said rotary shaft;

a coming off preventing member mounted to one end of said rotary shaft for preventing said rotary shaft from coming off said rolling bearing;

a cup member having a base wall portion fixed to the other end of said rotary shaft and a cylindrical peripheral wall portion standing toward one side in an axial direction of said rotary shaft from an outer peripheral portion of said bas e wall portion;

a permanent magnet unit fixed to an inner peripheral face of said peripheral wall portion such that a plurality of rotor-side magnetic poles formed of permanent magnet are arranged in a peripheral direction of s aid peripheral wall portion;

a plurality of blades fixed to an outer peripheral side of said peripheral wall portion of said cup member for exhaling toward said the other side;

a motor support having a cylindrical bearing holder that holds said rolling bearing therein;

a stator core fixed to said motor support and having a plurality of stator-side magnetic poles facing said plurality of rotor-side magnetic poles of said permanent magnet unit; and a plurality of exciting windings mounted to said stator core;

wherein a width dimension in a direction parallel with said axial direction of said rotors-side magnetic poles of said permanent magnet unit is determined such that said rotor-side magnetic poles completely face said stator-side magnetic poles and project toward said one side in said axial direction further than an end portion of said stator-side magnetic poles on said one side in said axial direction and that thrust for pushing said coming off preventing member against an inner ring of said rolling bearing has such a value as to sufficiently suppress vibration of said rotary shaft and, wherein, said rotary shaft is fitted with an annular spacer ring such that said spacer ring is positioned between said inner ring of said rolling bearing and said base wall portion of said cup member.

4. A single-bearing fan motor according to claim 3, wherein said exciting windings are mounted to said stator core through an insulator made of insulating material; and said insulator is provided with a projecting portion projecting toward said the other side further than an end portion of said bearing holder on said the other side in said axial direction.

* * * * *

UNITED STATES PATENT AND TRADEMARK OFFICE
CERTIFICATE OF CORRECTION

PATENT NO. : 6,437,471 B1
DATED : August 20, 2002
INVENTOR(S) : Ogawara et al.

It is certified that error appears in the above-identified patent and that said Letters Patent is hereby corrected as shown below:

Column 7,
Line 15, delete "bas e" and insert -- base --.
Line 19, delete "s aid" and insert -- said --.

Column 8,
Line 6, delete "rotors-side" and insert -- rotor-side --.

Signed and Sealed this

Thirty-first Day of December, 2002

JAMES E. ROGAN
*Director of the United States Patent and Trademark Office*